(12) United States Patent
Calgua et al.

(10) Patent No.: US 8,578,876 B2
(45) Date of Patent: Nov. 12, 2013

(54) METHOD FOR THE PRODUCTION OF COMPOSITE ELEMENTS BASED ON ISOCYANATE-BASED FOAMS

(75) Inventors: Erwin Calgua, Edenkoben (DE); Bernd Schaper, Diepholz (DE); Lars Schoen, Nordhorn (DE); Peter von Malotki, Lemfoerde (DE); Pit Lehmann, Osnabrueck (DE); Michael Thater, Goldenstedt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 282 days.

(21) Appl. No.: 12/885,969

(22) Filed: Sep. 20, 2010

(65) Prior Publication Data
US 2011/0056431 A1 Mar. 10, 2011

Related U.S. Application Data

(62) Division of application No. 11/574,146, filed as application No. PCT/EP2005/009760 on Sep. 10, 2005, now Pat. No. 7,871,489.

(30) Foreign Application Priority Data

Sep. 13, 2004 (DE) .................. 10 2004 044 595

(51) Int. Cl.
*B05C 5/02* (2006.01)
(52) U.S. Cl.
USPC ......... 118/52; 118/56; 118/323; 118/DIG. 16

(58) Field of Classification Search
USPC ....... 118/52, 56, 323, DIG. 16; 427/240, 241, 427/207.1; 156/578; 239/650, 681, 687, 239/223, 224, 679, 682–686, 689, 222.11, 239/700–703; 141/34, 283; 99/494, 516, 99/534, 536
See application file for complete search history.

(56) References Cited

U.S. PATENT DOCUMENTS

| | | | |
|---|---|---|---|
| 1,468,119 A * | 9/1923 | MaClachlan | 261/88 |
| 1,671,866 A * | 5/1928 | Linville et al. | 423/520 |
| 1,692,617 A * | 11/1928 | Bowen | 239/223 |
| 2,912,171 A * | 11/1959 | Merrick | 239/220 |
| 3,144,209 A * | 8/1964 | Griffiths | 239/696 |
| 3,147,137 A | 9/1964 | Glass et al. | |
| 4,122,203 A | 10/1978 | Stahl | |
| 4,749,586 A | 6/1988 | Bravet et al. | |
| 4,803,746 A | 2/1989 | Bryant | |
| 5,296,303 A | 3/1994 | Bravet et al. | |
| 5,407,517 A | 4/1995 | Hansel et al. | |
| 5,693,423 A | 12/1997 | Laura et al. | |
| 7,540,932 B2 | 6/2009 | Rüb et al. | |
| 2003/0029928 A1 | 2/2003 | Andersson et al. | |

FOREIGN PATENT DOCUMENTS

| | | |
|---|---|---|
| EP | 0 036 508 | 9/1981 |
| JP | 11-179245 | 7/1999 |
| JP | 2006031850 A | 2/2006 |
| WO | WO 99/00559 | 1/1999 |

\* cited by examiner

*Primary Examiner* — Laura Edwards
(74) *Attorney, Agent, or Firm* — Oblon, Spivak, McClelland, Maier & Neustadt, L.L.P.

(57) ABSTRACT

An apparatus for application of liquids to a continuously conveyed outer layer having a rotating plate which is horizontal and parallel to the outer layer or with a deviation of up to 15° from horizontal, wherein a liquid applied to the rotating plate is ejected centrifugally from the rotating plate via rotation and then, via gravity, passed onto the outer layer below the rotating plate, is provided.

12 Claims, 3 Drawing Sheets

METHOD FOR THE PRODUCTION OF COMPOSITE ELEMENTS BASED ON ISOCYANATE-BASED FOAMS

CROSS REFERENCE TO RELATED APPLICATIONS

This application is a divisional application of prior U.S. patent application Ser. No. 11/574,146, filed on Feb. 23, 2007 now U. S. Pat. No. 7,871,489, the disclosure of which is incorporated herein by reference in its entirety. The parent application is the National Stage of PCT/EP05/09760, filed Sep. 10, 2005, the disclosure of which is incorporated herein by reference in its entirety. The parent application claims priority to German Application No. 102004044595.8, filed Sep. 13, 2004, the disclosure of which is incorporated herein by reference in its entirety.

BACKGROUND OF THE INVENTION

The production of composite elements composed in particular of metallic outer layers and of a core composed of isocyanate-based foams, mostly polyurethane (PU) foams or polyisocyanurate (PIR) foams, is nowadays widely practiced on continuously operating twin-belt systems, and the elements are often also termed sandwich elements. Alongside sandwich elements for cold store insulation, elements with colored outer layers are of constantly increasing importance, these being intended for forming facades on a very wide variety of buildings. The outer layers used here comprise not only coated steel sheet but also stainless steel sheet, copper sheet or aluminum sheet. In particular in the case of facade elements, adhesion between foam and outer layer is decisive. If the color shade is dark, the insulated outward-facing outer layer can easily reach temperatures around 80° C. If adhesion of the foam to the outer layer is inadequate, blisters are produced on the surface, caused by separation of foam from the sheet, and these make the facade unattractive. In order to eliminate these problems, adhesion-promoter lacquers are applied before production of the coil is complete. However, reasons related to the process require that additives, such as flow aids, hydrophobicizing agents, de-aerating agents, and the like be present in the adhesion-promoter lacquers. These additives sometimes considerably impair the polyurethane foaming process. Added to this are interactions in the steel coil between lacquer on the outward-facing side and on the reverse side. The additional substances thus transferred to the reverse side mostly also have an adverse effect on the PU foaming process and lead to defects in the sandwich element. Even the corona treatment of the outer layers, which is now prior art, is in many cases inadequate to eliminate these defects. Furthermore, a very wide variety of reasons can prevent ideal adjustment of the twin-belt temperature for the particular system. This is particularly the case during production start-up procedures. This can likewise have an adverse effect on the foaming process and on the adhesion of the foam to the metallic outer layers.

Another frequent occurrence in the production of sandwich elements, caused by a wide variety of reasons, is undesired air inclusions, known as cavities, at the lower and upper outer layer, between sheet metal and rigid polyurethane foam. These air inclusions between sheet metal and foam can lead to blistering of the sheet metal particularly when severe temperature changes occur in the facade element application. Again, this then makes the facade unattractive.

Consequently, there is a requirement to find a process which gives a lasting improvement in the adhesion of the PU foams and PIR foams to metallic outer layers and which also withstands adverse external circumstances surrounding the production process. The process may be used continuously or batchwise. By way of example, a batchwise mode of operation can be used during twin-belt start-up procedures and for composite elements produced by means of presses which operate batchwise. Continuous use is required if the PU systems or PIR systems used intrinsically have very low adhesion to metallic outer layers.

At the same time, formation of cavities should be avoided in this process, in particular at the lower outer layer.

One possible way of improving adhesion is to apply an adhesion promoter to the outer layers. In the case of sandwich elements it is often the lower outer layer which has the poorest adhesion, determined in the tensile test. Furthermore, in conventional structures produced by means of sandwich elements the sheet-metal lower side is the outward-facing side of the facade and is therefore exposed to extreme conditions, such as temperature and suction effects, and is therefore subject to greater stress than the upper side of the sandwich element. For these reasons, it is possible to apply the adhesion promoter only to the lower outer layer. Once the adhesion promoter has been applied to the lower outer layer, the PU system or PIR system is applied to the outer layer, thus giving a composite element whose structure is: outer layer-adhesion promoter-rigid PU/PIR foam-outer layer.

There is a wide variety of established processes for the application of lacquers, adhesion promoters, adhesives, and thin films generally to sheet metal or to other substrates. Lacquers can be applied to substrates by means of dipping, spraying, electrostatic deposition, plasma coating, flow coating, or rolling. It is also possible to use spin coating to produce thin films on a substrate. Here, the substance is applied to the substrate and the substrate is then rotated, thus distributing the substance uniformly over the substrate. However, processes of this type are not practical in the case of the sheet metal used for production of sandwich elements.

A process very similar to spin coating likewise utilizes a rotating apparatus, but here the substance is ejected centrifugally and laterally via the rotation of the rotating plate. This technique is particularly good for internal coating of pipes or of other cavities, as described by way of example in U.S. Pat. No. 3,349,568, DE 2808903 and WO 9959730. One embodiment of this technique serves for the coating of moldings and also of sheet metal. However, in all of these processes the outer layers to be coated are conducted around the rotating plate and the substance is always applied to the relevant outer layer by centrifugal ejection from the rotating plate in a lateral direction, as described by way of example in DE 2412686. An electrical field is also sometimes applied here to improve application. However, all of these processes can form large amounts of aerosols which are hazardous to the environment and to health.

DETAILED DESCRIPTION OF THE INVENTION

Figure 1:
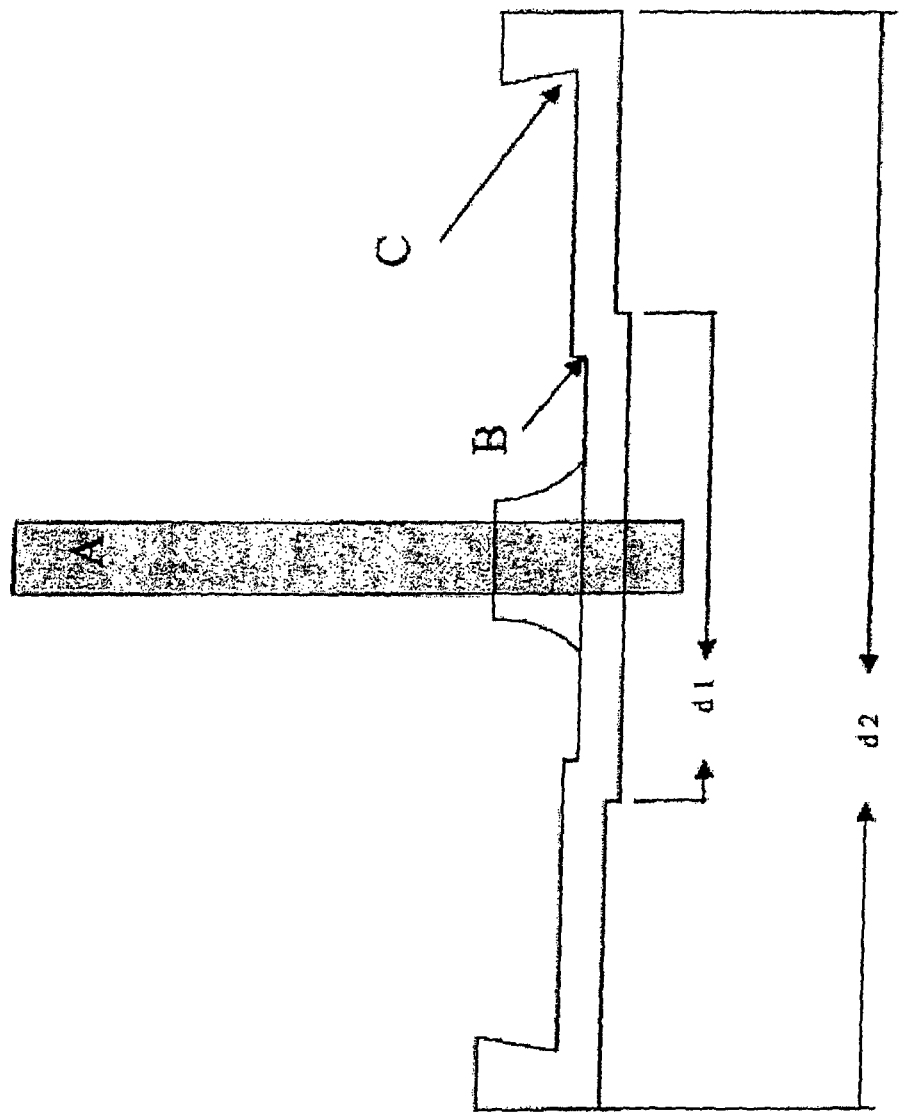
FIG. 1 shows a rotation plate according to one embodiment of the invention.

It was then an object of the present invention to find a suitable process for applying an adhesion promoter to horizontal sheet metal or to another outer layer which is continuously transported in a horizontal direction, since sandwich elements are generally produced using a continuously operating twin belt. There should be no formation or release of aerosols here. Furthermore, the process for applying the adhesion promoter should be substantially maintenance-free.

Surprisingly, the object could be achieved by applying the adhesion promoter to the outer layer by way of a rotating plate located horizontally, preferably parallel to the outer layer.

The invention therefore provides a process for production of composite elements composed of at least one outer layer a) and of an rigid isocyanate-based foam b), where between the outer layer a) and the rigid isocyanate-based foam b) an adhesion promoter c) has been applied, and where the outer layer a) is continuously moved and the adhesion promoter c) and the starting material for the rigid isocyanate-based foam b) are applied successively to the outer layer, which comprises applying the adhesion promoter c) by means of a rotating plate which has been installed horizontally or with a deviation of up to 15° from horizontal, preferably parallel to the outer layer.

The invention further provides an apparatus for application of liquids to a continuously conveyed outer layer, wherein the liquid is applied to a rotating plate which has been installed horizontally and preferably parallel to and above the outer layer, is ejected centrifugally from the rotating plate via rotation and then, via gravity, passes onto the outer layer.

When the inventive apparatus is used for production of composite elements comprising isocyanate-based foams, the liquid is preferably an adhesion promoter c).

The adhesion promoter c) used preferably comprises a reactive single- or multicomponent polyurethane system.

An advantageous process has proven to be one wherein at the juncture of application of the starting material for the rigid isocyanate-based foam b) to the lower outer layer, the adhesion promoter c) has not yet exceeded its open time, i.e. at that juncture the polyurethane system has not fully completed its reaction. Control in this respect can be exerted via the distance between the application device for the adhesion promoter and the apparatus for application of the starting material for the rigid isocyanate-based foam b), or preferably via adjustment of the reactivity of the adhesion promoter.

Outer layers which may be used comprise gypsum plasterboard, glass nonwovens, aluminum foils, aluminum sheets, copper sheets, or steel sheets, preferably aluminum foils, aluminum sheets, or steel sheets, particularly preferably steel sheets. Coated or uncoated steel sheets may be used. They are preferably not corona-treated.

The outer layer is preferably transported with a constant velocity of from 2 to 15 m/min, preferably from 3 to 12 m/min, particularly preferably from 3 to 9 m/min. The outer layer here is preferably horizontal at least from the application of the polyurethane system b), preferably during the entire period from application of the adhesion promoter. The adhesion promoter may also be applied when the outer layer has slight inclination in the direction of transport and is therefore not conducted horizontally.

In conventional sandwich elements, the rigid isocyanate-based foam is enclosed by an upper and a lower outer layer. It is sufficient for the lower outer layer to be provided with an adhesion promoter.

In the inventive process here, when sheet metal and foils are used as outer layers, the outer layers are successively unwound from a roll, profiled, heated, if appropriate corona-treated in order to increase coatability by polyurethane, coated with the starting material for the rigid isocyanate-based foam b), also often termed PU system or PIR system, cured in the twin belt, and finally cut to the desired length.

In principle, the application of the adhesion promoter c) may take place at any point in the process between unwinding of the outer layers and application of the PU system or PIR system.

It is advantageous here for the distance between application of the adhesion promoter c) and application of the PU system or PIR system b) to be small. This minimizes the waste produced at the start and end of this process, and also in the event of unforeseen interactions of the production process.

The adhesion promoter is discharged by way of a rotating plate which has been installed horizontally, preferably parallel to and above the lower outer layer, and which can be rotated by way of a drive. The rotating plate can also be attached with a deviation of up to 15° from horizontal. The rotating plate may be round or elliptical. The length:width ratio for the rotating plate is preferably from 1 to 1.8, particularly preferably from 1 to 1.4, and in particular from 1.0 to 1.25.

The rotating plate may be completely flat, or the edge of the rotating plate may have been angled-off or rounded-off upward. It is preferable that the edge of the rotating plate used has been angled-off or rounded-off upward. Holes are introduced into the angled-off section in order to ensure discharge of the adhesion promoter c). The diameter and number of the holes are mutually matched in such a way as to permit maximum uniformity of application of finely dispersed adhesion promoter c) to the outer layer thereunder, and to permit all of the material applied to the rotating plate to be discharged, and to minimize the maintenance cost of the rotating plate. The outer angled-off section preferably has from 4 to 64 holes with a diameter of from 0.5 to 3 mm, preferably from 12 to 40 holes with a diameter of from 1 to 3 mm, particularly preferably from 15 to 30 holes with a diameter of from 1.5 to 2.5 mm.

In one embodiment, the design of the rotating plate can be cascade-like. FIG. 1 shows the side view of this type of rotating plate. The cascades here have been arranged so as to rise from the axis of rotation (A) outward. At the transitions from one cascade to the adjacent cascade (B) there may be holes introduced into the rotating plate, so that a portion of the adhesion promoter can be discharged onto the lower outer layer at these cascade transitions. This type of rotating plate designed in the manner of a cascade provides particularly uniform application of the adhesion promoter to the outer layer located therebelow. The application of the adhesion promoter to the rotating plate takes place with maximum closeness to the axis of rotation. Surprisingly, it has been found here that the adhesion promoter is distributed particularly uniformly onto the lower outer layer if the point of application of the adhesion promoter parallel to the direction of production is exactly prior to or subsequent to the axis of rotation.

The diameter of the rotating plate depends on the width of the outer layer and is from 0.05 to 0.3 m, preferably from 0.1 to 0.25 m, particularly preferably from 0.12 to 0.22 m, based on the long side. The rotating plate has been installed at a height of from 0.02 to 0.2 m, preferably from 0.03 to 0.18 m, particularly preferably from 0.03 to 0.15 m, above the outer layer to be wetted.

A rotating plate having from 2 to 4, preferably from 2 to 3, particularly preferably 2, cascades can be used.

The angle of inclination of the holes which are introduced into the rotating plate for the discharge of the adhesion promoter is from about 10 to 70°, preferably from 30 to 60°, with respect to the lower outer layer. The holes may have been introduced at the cascade transitions or else at the outer angled-off section. The number of holes here increases from cascade to cascade from the inside toward the outside. From 10 to 30, preferably from 12 to 25, particularly preferably from 12 to 20, holes whose diameter is from 1.5 to 2.5 mm have been introduced here at the cascade transition (B) innermost with respect to the axis of rotation. The number of holes at the outermost angled-off section (C) is from 12 to 40, preferably from 12 to 30, particularly preferably from 15 to 30, their diameter being from 1.5 to 2.5 mm. In one particularly preferred embodiment of the rotating plate, the holes at the outer angled-off section are designed so as to alternate with different inclinations with respect to the outer layer. The ratio of the diameters of adjacent cascades $d_n/d_{n-1}$ is from 1.2 to 3, preferably from 2 to 2.6.

The wetting radius of the adhesion promoter on the lower outer layer is preferably from 0.25 to 1 m, with preference from 0.35 to 0.75 m.

The rotation rate of the rotating plate is preferably from 200 to 2500 rpm, particularly preferably from 200 to 2000 rpm, and in particular from 300 to 1500 rpm.

The amount of the adhesion promoter c) applied to the outer layer is from 30-300 g/m$^2$, preferably from 40-200 g/m$^2$, particularly preferably from 50-120 g/m$^2$.

Prior to its application to the rotating plate, the adhesion promoter c) is mixed in a machine, using high- or low-pressure mixers, preferably low-pressure mixers, and applied to the rotating plate by way of a suitable discharge apparatus, such as a downstream mixing unit. If the rotating plate is then rotated by means of a drive, the adhesion promoter c) is distributed over the surface of the outer layer continuously conveyed below the rotating plate. By way of example, a mixing unit composed of plastic may be used for the mixing and application of the adhesion promoter to the rotating plate. The amount of the adhesion promoter c) discharged is matched to the velocity of the continuously operating twin belt in such a way as to permit the desired amount to be applied per m$^2$ of sheet metal.

The height of the rotating plate above the lower outer layer, the diameter of the rotating plate, and the speed of rotation, have been mutually matched in such a way that the adhesion promoter c) discharged gives maximum uniformity of wetting, extending to the edges, of the sheet metal continuously transported thereunder.

In contrast to the prior art, although the adhesion promoter c) is ejected centrifugally and laterally, the result of the low speed of rotation and the effect of gravity is that it is distributed onto the outer layer located horizontally, preferably parallel to and below the rotating plate. Surprisingly, it has now been found that application by means of the technique described above forms no aerosol.

The term aerosols is used here for colloidal systems composed of gases, such as air, comprising finely distributed small liquid particles of diameter from about $10^{-7}$ to $10^{-3}$ cm.

Using the small application quantities required for cost-effectiveness, it is not possible to achieve complete wetting of the lower outer layer with the adhesion promoter c). Surprisingly, however, it has now been found that the coating achieved on the lower outer layer by means of the inventive application technique using small application quantities is sufficient to achieve a marked improvement in the tensile strength between the treated outer layer and the foam located thereupon, when comparison is made with untreated sheet metal.

The inventive process can also markedly reduce the proportion of cavities on the lower outer layer.

Once the adhesion promoter c) has been applied to the lower outer layer, the starting material for the rigid isocyanate-based foam b) is applied. The reactivity of the adhesion promoter c) here is adjusted in such a way that the systems b) and c) react with one another (i.e. the open time of the adhesion promoter c) has not been exceeded at the juncture of application of b)), and cure after a defined time.

Use of the adhesion promoter c) permits lowering of the twin belt temperature, which must normally reach 60° C. for the processing of PIR systems, to 55° C.

Figure 2:
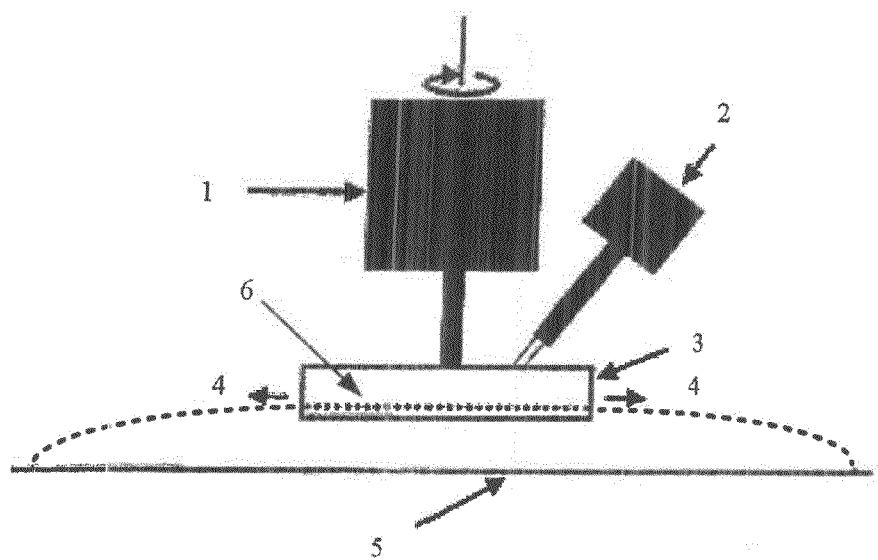
FIG. 2 shows the arrangement of the apparatus according to one embodiment of the invention.

FIG. 2 shows a side view of the inventive apparatus. The adhesion promoter is applied by way of the metering equipment (2) to the rotating plate (3) which has been attached to the drive (1) horizontally or preferably parallel to the outer layer (5) and which is rotated by way of the drive (1). The adhesion promoter is ejected centrifugally (4) through holes (6) from the rotating plate (3) via rotation and passes by means of gravity onto the outer layer (5).

Figure 3:
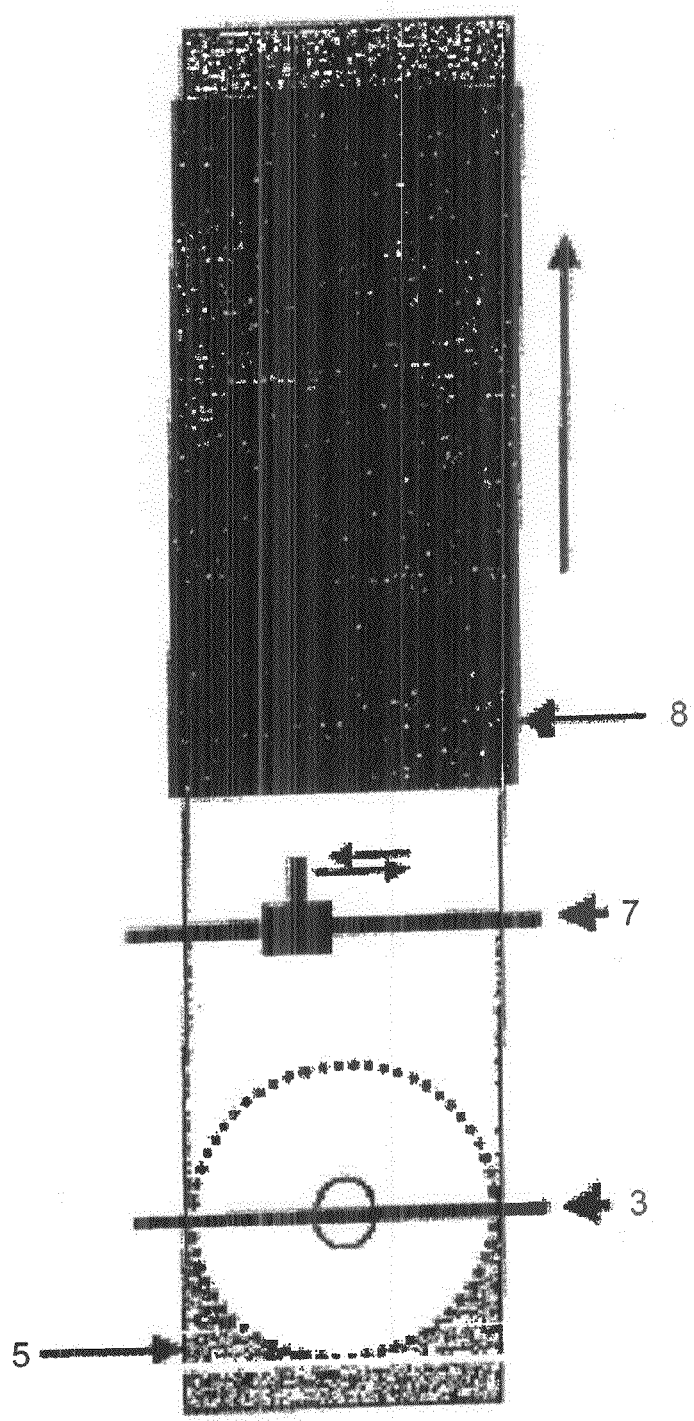
FIG. 3 shows an arrangement of the equipment according one embodiment of the invention.

FIG. 3 shows a plan view of an apparatus for production of sandwich elements, using the inventive apparatus. The following are applied to the lower outer layer (5): the adhesion promoter c) by way of the rotating plate 3, and then the starting material for the rigid isocyanate-based foams b), by way of the foaming portal 7. Upon cure of c) and b) the isocyanate-based foam (8) is obtained.

Adhesion promoters which may be used are the polyurethane-based adhesion promoters known from the prior art. These are generally obtainable via reaction of polyisocyanates with compounds having two hydrogen atoms reactive toward isocyanates, the reaction ratio preferably being selected in such a way that the ratio of the number of isocyanate groups to the number of groups reactive toward isocyanates in the reaction mixture is from 0.8 to 1.8:1, preferably from 1 to 1.6:1.

Polyisocyanates which may be used are the conventional aliphatic, cycloaliphatic, and in particular aromatic di- and/or polyisocyanates. Preference is given to use of tolylene diisocyanate (TDI), diphenylmethane diisocyanate (MDI), and in particular mixtures composed of diphenylmethane diisocyanate and polyphenylene polymethylene polyisocyanates (crude MDI).

The isocyanates Lupranat® M 50, Lupranat® M 70 and Lupranat® M 200 from BASF AG are preferably used here. In one preferred embodiment, the isocyanates used to produce the rigid isocyanate-based foam b) and those used to produce the adhesion promoter c) are identical. In one preferred embodiment Lupranat® M 70 is used, and in one particularly preferred embodiment Lupranat® M 200 is used.

Compounds which may be used and have at least two hydrogen atoms reactive toward isocyanate are generally those which have two or more reactive groups in the molecule, selected from OH groups, SH groups, NH groups, NH$_2$ groups, and acidic CH groups, e.g. β-diketo groups.

Preference is given to use of polyetherols and/or polyesterols, polyether polyols being particularly preferred. The hydroxyl number of the polyetherols and/or polyesterols used is preferably from 25 to 800 mg KOH/g, and the molar weights are generally above 400. The polyurethanes may be prepared without or with chain extenders and/or crosslinking agents. Particular chain extenders and/or crosslinking agents which may be used are di- or trifunctional amines and alcohols, in particular diols and/or triols with molecular weights below 400, preferably from 60 to 300.

The viscosity of the polyol component of the adhesion promoter c) here is preferably from 100 to 1000 mPas, with preference from 100 to 800 mPas, particularly preferably from 150 to 400 mPas (25° C.).

The adhesion promoter may, if appropriate, comprise additives or reactive flame retardants. The amount of these flame retardants generally used is from 0.1 to 30% by weight, based on the total weight of the polyol component.

The reaction of the polyisocyanates with the polyols is preferably carried out without addition of any physical blowing agents. However, the polyols used may comprise residual water, which acts as a blowing agent. This gives the resultant polyurethane adhesion promoters a density of from 200 to 1200 g/l, preferably from 400 to 1000 g/l, particularly preferably from 450 to 900 g/l.

The rigid isocyanate-based foams b) used for the inventive process are produced in a conventional and known manner via reaction of polyisocyanates with compounds having at least two hydrogen atoms reactive toward isocyanate groups, in the presence of blowing agents, catalysts, and conventional auxiliaries and/or additives. The following details relate to the starting materials used.

Organic polyisocyanates used are preferably aromatic polyfunctional isocyanates.

Individual examples which may be mentioned are tolyene 2,4- and 2,6-diisocyanate (TDI) and the corresponding isomer mixtures, diphenylmethane 4,4'-, 2,4'- and 2,2'-diisocyanate (MDI) and the corresponding isomer mixtures, mixtures composed of diphenylmethane 4,4'- and 2,4'-diisocyanates, polyphenyl polymethylene polyisocyanates, mixtures composed of diphenylmethane 4,4'-, 2,4'- and 2,2'-diisocyanates and of polyphenyl polymethylene polyisocyanates (crude MDI) and mixtures composed of crude MDI and of tolylene diisocyanates. The organic di- and polyisocyanates may be used individually or in the form of mixtures.

Use is also often made of what are known as modified polyfunctional isocyanates, i.e. products obtained via chemical reaction of organic di- and/or polyisocyanates. By way of example, mentioned may be made of di- and/or polyisocyanates containing isocyanurate groups and/or containing urethane groups. The modified polyisocyanates may, if appropriate, be mixed with one another or with unmodified organic polyisocyanates, such as diphenylmethane 2,4'- or 4,4'-diisocyanate, crude MDI, or tolylene 2,4- and/or 2,6-diisocyanate.

Use may also be made here of reaction products of polyfunctional isocyanates with polyhydric polyols, or else of mixtures of these with other di- and polyisocyanates.

An organic polyisocyanate which has proven particularly successful is crude MDI with an NCO content of from 29 to 33% by weight and a viscosity at 25° C. in the range from 150 to 1000 mPas.

Compounds b) which may be used and have at least two hydrogen atoms reactive toward isocyanate groups are in particular polyether alcohols and/or polyester alcohols with OH numbers in the range from 25 to 800 mg KOH/g.

The polyester alcohols used are mostly prepared via condensation of polyhydric alcohols, preferably diols, having from 2 to 12 carbon atoms, preferably from 2 to 6 carbon atoms, with polybasic carboxylic acids having from 2 to 12 carbon atoms, e.g. succinic acid, glutaric acid, adipic acid, suberic acid, azelaic acid, sebacic acid, decanedicarboxylic acid, maleic acid, fumaric acid, or preferably phthalic acid, isophthalic acid, terephthalic acid, or the isomeric naphthalenedicarboxylic acids.

The polyesterols used mostly have a functionality of from 1.5 to 4.

Polyether polyols particularly used are those prepared by known processes, e.g. via anionic polymerization of alkylene oxides onto H-functional starter substances in the presence of catalysts, preferably alkali metal hydroxides.

Alkylene oxides mostly used are ethylene oxide and/or propylene oxide, preferably pure propylene 1,2-oxide.

Starter substances particularly used are compounds having at least 3, preferably from 4 to 8, hydroxy groups or having at least two primary amino groups in the molecule.

Starter substances used and having at least 3, preferably from 4 to 8, hydroxy groups in the molecule are preferably trimethylolpropane, glycerol, pentaerythritol, sugar compounds, such as glucose, sorbitol, mannitol, and sucrose, polyhydric phenols, resols, e.g. oligomeric condensates composed of phenol and formaldehyde, and Mannich condensates composed of phenols, of formaldehyde, and of dialkanolamines, and also melamine.

Starter substances used and having at least two primary amino groups in the molecule are preferably aromatic di- and/or polyamines, such as phenylenediamines, 2,3-, 2,4-, 3,4-, and 2,6-tolylenediamine, and 4,4'-, 2,4'-, and 2,2'-diaminodiphenylmethane, and also aliphatic di- and polyamines, such as ethylenediamine.

The preferred functionality of the polyether polyols is from 3 to 8 and their preferred hydroxy numbers are from 25 to 800 mg KOH/g, in particular from 240 to 570 mg KOH/g.

Other compounds having at least two hydrogen atoms reactive toward isocyanate are crosslinking agents and chain extenders which are used concomitantly, if appropriate. Addition of difunctional chain extenders, trifunctional or higher-functionality crosslinking agents, or else, if appropriate, mixtures of these can prove advantageous for modification of mechanical properties. Chain extenders and/or crosslinking agents preferably used are alkanolamines and in particular diols and/or triols with molecular weights below 400, preferably from 60 to 300.

The amount advantageously used of chain extenders, crosslinking agents, or mixtures of these is from 1 to 20% by weight, preferably from 2 to 5% by weight, based on the polyol component.

The rigid foams are usually produced in the presence of blowing agents, catalysts, flame retardants, and cell stabilizers, and, if necessary, of other auxiliaries and/or additives.

Water may be used as blowing agent, and reacts with isocyanate groups with elimination of carbon dioxide. What are known as physical blowing agents may also be used in combination with, or preferably instead of, water. These are compounds inert with respect to the starting components, mostly liquid at room temperature, and evaporating under the conditions of the urethane reaction. The boiling point of these compounds is preferably below 50° C. Among the physical blowing agents are also compounds which are gaseous at room temperature and which are introduced or dissolved into the starting components under pressure, examples being carbon dioxide, low-boiling alkanes, and fluoroalkanes.

The compounds are mostly selected from the group comprising alkanes and/or cycloalkanes having at least 4 carbon atoms, dialkyl ethers, esters, ketones, acetals, fluoroalkanes having from 1 to 8 carbon atoms, and tetraalkylsilanes having from 1 to 3 carbon atoms in the alkyl chain, in particular tetramethylsilane.

Examples which may be mentioned are propane, n-butane, isobutane, cyclobutane, n-pentane, isopentane, cyclopentane, cyclohexane, dimethyl ether, methyl ethyl ether, methyl butyl ether, methyl formate, acetone, and also fluoroalkanes which can be degraded in the troposphere and therefore do not damage the ozone layer, e.g. trifluoromethane, difluoromethane, 1,1,1,3,3-pentafluorobutane, 1,1,1,3,3-pentafluoropropane, 1,1,1,2-tetrafluoroethane, difluoroethane, and heptafluoropropane. The physical blowing agents mentioned may be used alone or in any desired combinations with one another.

The polyurethane foams or polyisocyanurate foams usually comprise flame retardants. It is preferable to use bromine-free flame retardants. It is particularly preferable to use flame retardants comprising phosphorus atoms, in particular trischloroisopropyl phosphate, diethyl ethanephosphonate, triethyl phosphate and/or diphenyl cresyl phosphate.

Catalysts particularly used are compounds which markedly accelerate the reaction of the isocyanate groups with the groups reactive toward isocyanate groups. Catalysts of this type are strongly basic amines, e.g. secondary aliphatic amines, imidazoles, amidines, and also alkanolamines, and/or organometallic compounds, in particular those based on tin.

If isocyanurate groups are to be incorporated in the rigid foam, specific catalysts are needed. Isocyanurate catalysts usually used are metal carboxylates, in particular potassium acetate and its solutions. The catalysts may be used alone or in any desired mixtures with one another, as required.

Auxiliaries and/or additives which may be used for this purpose are substances known per se, e.g. surfactants, foam stabilizers, cell regulators, fillers, pigments, dyes, hydrolysis stabilizers, antistatic agents, fungistatic agents, and bacteriostatic agents.

Further details concerning the conduct of the inventive process, starting materials used, blowing agents, catalysts, and also auxiliaries and/or additives are found by way of example in Kunststoffhandbuch [Plastics Handbook], volume 7, "Polyurethane" ["Polyurethanes"] Carl-Hanser-Verlag Munich, 1st edition, 1966, 2nd edition, 1983, and 3rd edition, 1993.

To produce the rigid isocyanate-based foams, the polyisocyanates and the compounds having at least two hydrogen atoms reactive toward isocyanate groups are reacted in amounts such that the isocyanate index is in the range from 100 to 220, preferably from 115 to 180, in the case of the polyurethane foams. The rigid polyurethane foams may be produced batchwise or continuously with the aid of known mixing apparatus.

It is also possible to operate with an index >180, preferably from 200 to 500, particularly preferably from 250 to 500, for production of polyisocyanurate foams.

The starting components may be mixed with the aid of known mixing apparatus.

The inventive rigid PU foams are usually produced by the two-component process. In this process, the compounds having at least two hydrogen atoms reactive toward isocyanate groups are mixed with the blowing agents, with the catalysts, and also with the other auxiliaries and/or additives to give what is known as a polyol component, and this is reacted with the polyisocyanates or mixtures composed of the polyisocyanates and, if appropriate, blowing agents, also termed the isocyanate component.

The starting components are usually mixed at a temperature of from 15 to 35° C., preferably from 20 to 30° C. The reaction mixture may be mixed using high- or low-pressure feed machines.

The density of the rigid foams used for this purpose is preferably from 10 to 400 kg/m$^3$, preferably from 20 to 200 kg/m$^3$, in particular from 30 to 100 kg/m$^3$.

The thickness of the composite elements is usually in the range from 5 to 250 mm.

EXAMPLES

A) Composition of Adhesion Promoter System
A Component
62 parts of polyetherol 1 composed of propylene glycol and propylene oxide, functionality 2, hydroxy number 250 mg KOH/g
25 parts of polyesterol 1 composed of phthalic anhydride, diethylene glycol, and oleic acid, functionality 1.8, hydroxy number 200 mg KOH/g
10 parts of trischloroisopropyl phosphate flame retardant, TCPP
2 parts of silicone-containing stabilizer
1 part of amine-containing PU catalyst
B Component
Isocyanate Lupranat M50, polymeric MDI (BASF AG)
A component and B component were mixed with one another in ratios such that the index was in the region of 115. No additional blowing agent was added. However, the polyols used comprised residual water, and the resultant density of the cured adhesion promoter was in the region of about 560 g/L.

B) Composition of PU System II
A Component
55.5 parts of polyetherol 1 composed of sorbitol and propylene oxide, functionality 5, hydroxy number 500 mg KOH/g
20 parts of flame retardant 1: trischloroisopropyl phosphate, TCPP
20 parts of flame retardant 2: PHT-4-diol (Great Lakes)
1.5 parts of silicone-containing stabilizer
3 parts of catalyst 1: amine-containing PU catalyst
Blowing agent 1 n-pentane
Blowing agent 2 water
B component
Isocyanate Lupranat M50, polymeric MDI (BASF AG)
A component, B component, and blowing agent were reacted in ratios such that the index was in the region of 130 and the envelope density achieved was 43 g/L.

C) Composition of PIR System
A component
56 parts of polyesterol 1 composed of phthalic anhydride, diethylene glycol and oleic acid, functionality 1.8, hydroxy number 200 mg KOH/g
10 parts of polyetherol 1 composed of ethylene glycol and ethylene oxide, functionality 2, hydroxy number 200 mg KOH/g
30 parts of flame retardant 1: trischloroisopropyl phosphate, TCPP
1.5 parts of stabilizer 1: silicone-containing stabilizer
1.5 parts of catalyst 1: PIR catalyst, salt of a carboxylic acid
1 part of catalyst 2: amine-containing PU catalyst
Blowing agent 1: n-pentane
Blowing agent 2: water
B component
Isocyanate Lupranat M50, polymeric MDI (BASF AG)
A component, B component, and blowing agent were mixed with one another in ratios such that the index was in the region of 350 and the envelope density achieved was 43 g/L.

The adhesion promoter system was mixed at slightly elevated temperature, from 30 to 50° C., by means of a low-pressure mixing machine (Unipre), and applied to the rotating plate by means of a mixing unit composed of plastic. The rotating plate had a diameter of 15 cm and had an angled-off edge. The height of the angled-off section was 15 mm. 32 holes had been installed near the edge, and the adhesion promoter system was ejected through these centrifugally by means of centrifugal force. The speed of rotation was 900 rpm. The width of the twin belt was 1.2 m and it was advanced at a constant velocity of 3 m/min. The amounts of adhesion promoter discharged were varied in such a way as to give applied amounts of 60, 80 and 100 g/m². The temperature of the twin belt was varied in the range from 55 to 60° C.

The adhesion promoter system c) was applied about 2 m upstream of the foaming portal. The polyisocyanurate system b) was applied by means of an oscillating applicator bar with multiple nozzles. The metallic outer layer was not corona-treated. Once the system had cured, test specimens of dimensions 100×100×5 mm were sawn, and the adhesion of the foam to the outer layer was determined to DIN EN ISO 527-1/DIN 53292.

The number of cavities was determined visually.

TABLE 1

Experimental parameters and results. Examples 5 and 6 are comparative examples for production of sandwich elements without use of adhesion promoter.

| Exp. No. | Amount applied of system I | Temperature of twin belt | Adhesion [N/mm²] | Aerosol formation | Pattern of application | Number of cavities |
|---|---|---|---|---|---|---|
| 1 | 60 g/m² | 60° C. | 0.6 | no | very uniform | very small |
| 2 | 80 g/m² | 60° C. | 0.7 | no | very uniform | very small |
| 3 | 100 g/m² | 60° C. | 0.8 | no | uniform | very small |
| 4 | 100 g/m² | 55° C. | 0.5 | no | uniform | very small |
| 5 | — | 55° C. | 0.12 | — | — | moderate |
| 6 | — | 60° C. | 0.15 | — | — | moderate |

The embodiment of the rotating plate was varied in order to achieve maximum uniformity of distribution of the adhesion promoter on the lower rotation layer.

TABLE 2

Rotating plate geometries used and application patterns observed for adhesion promoter system c) on the outer layer to be coated. Assessment is made here of the uniformity of application over the surface of the outer layer. When application is non-uniform, system c) mostly accumulates in the edge zones of the outer layer.

| Rotating plate no. | Geometry | Angled-off | Number of holes | Diameter [mm] | Speed of rotation [rpm] | Application pattern |
|---|---|---|---|---|---|---|
| 1 | round | no | — | 150 | 900 | uniform |
| 2 | round | yes | 32 | 150 | 900 | uniform |
| 3 | round | yes | 10 | 160 | 700 | non-uniform |
| 4 | cascade-like (2 cascades) | yes | inner 16; outer 20 | 65, 150 | 1200 | very uniform |
| 5 | cascade-like (2 cascades) | yes | inner 12; outer 24 | 75, 260 | 800 | very uniform |

The invention claimed is:

1. An apparatus for application of liquids to a continuously conveyed outer layer, comprising:

a rotating plate above the continuously moving outer layer; wherein the rotating plate is horizontal and parallel to the outer layer or with a deviation of up to 15° from horizontal, the rotating plate comprises cascades arranged to rise from an axis of rotation outward, a transition from one cascade to an adjacent cascade comprises at least one hole, a ratio of the diameters of adjacent cascades $d_n/d_{n-1}$ is from 1.2 to 3, the rotating plate comprises a circumferentially elevated edge region which is angled off or rounded off upward, and a liquid applied to the rotating plate is ejected centrifugally from the rotating plate via rotation and then, via gravity, passes onto the outer layer below the rotating plate.

2. The apparatus for application of liquids to a continuously conveyed outer layer according to claim 1, wherein the rotating plate is horizontal and parallel to the outer layer.

3. The apparatus for application of liquids to a continuously conveyed outer layer according to claim 1, wherein a height of edge region which is angled-off or rounded-off upward is at least 15 mm.

4. The apparatus for application of liquids to a continuously conveyed outer layer according to claim 1, wherein the edge region comprises holes.

5. The apparatus for application of liquids to a continuously conveyed outer layer according to claim 4, wherein the edge region comprises from 4 to 64 holes.

6. The apparatus for application of liquids to a continuously conveyed outer layer according to claim 5, wherein a diameter of the holes in the edge region is from 1 to 3 mm.

7. The apparatus for application of liquids to a continuously conveyed outer layer according to claim 2, wherein a height of the edge region which is angled-off or rounded-off upward is at least 15 mm.

8. The apparatus for application of liquids to a continuously conveyed outer layer according to claim 7, wherein the edge region comprises holes.

9. The apparatus for application of liquids to a continuously conveyed outer layer according to claim 8, wherein the edge region comprises from 4 to 64 holes.

10. The apparatus for application of liquids to a continuously conveyed outer layer according to claim 9, wherein a diameter of the holes in the edge region is from 1 to 3 mm.

11. The apparatus for application of liquids to a continuously conveyed outer layer according to claim 4 wherein an angle of inclination of the holes in the rotating plate is from about 10 to 70°.

12. The apparatus for application of liquids to a continuously conveyed outer layer according to claim 1 wherein a diameter of the rotating plate is from 0.05 m to 0.3 m.

* * * * *